INVENTOR
FRANCIS A. GICCA
BY Herbert W. Arnold
ATTORNEY

Nov. 12, 1968 F. A. GICCA 3,411,089

COMMUNICATION SYSTEM

Filed June 28, 1962 3 Sheets-Sheet 2

INVENTOR
FRANCIS A. GICCA
BY Herbert W. Arnold
ATTORNEY

INVENTOR
FRANCIS A. GICCA
BY Herbert W. Arnold
ATTORNEY

United States Patent Office 3,411,089
Patented Nov. 12, 1968

3,411,089
COMMUNICATION SYSTEM

Francis A. Gicca, Bedford, Mass., assignor to Raytheon Company, Lexington, Mass., a corporation of Delaware
Filed June 28, 1962, Ser. No. 207,158
15 Claims. (Cl. 325—33)

Figure 1A:
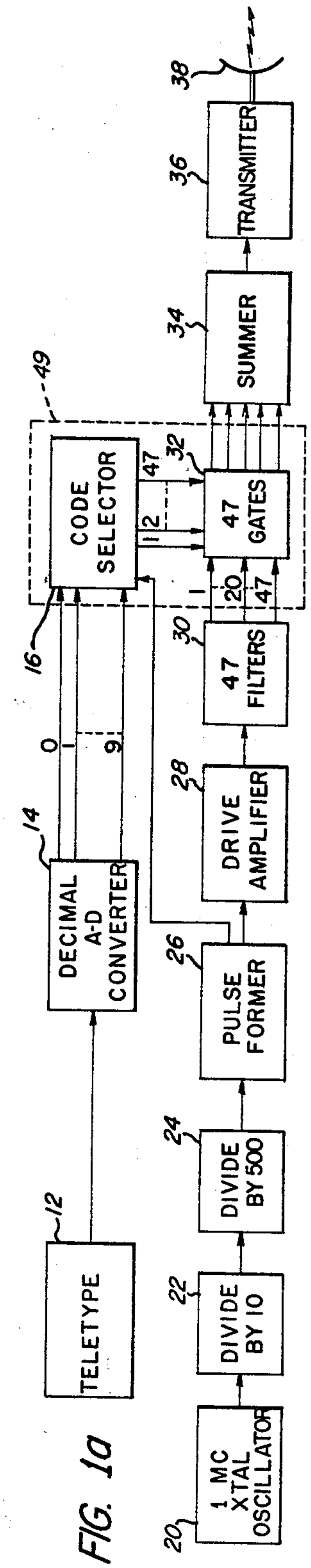

This invention relates to secure communication systems, and, more particularly, to a means for coding a transmitted signal in a manner which excludes effective jamming and compromise, as well as being efficient and cryptographically secure.

In the past, communication systems have been employed using amplitude modulation, frequency modulation, single sideband, multiplex, and other coding of the carrier wave in an effort to provide maximum message capability in an efficient and secure communications system. However, coding techniques of this type are either subject to compromise by various forms of jamming, or to compromise by transmission of false signals intended to imitate or confuse the original and authentic signal. In addition, the power required successfully to transmit information over such systems for a particular distance, and successfully avoid jamming, has been impractically high or difficult to provide or generate. It is, therefore, an object of the invention to provide a signal transmission system which is coded in a manner which achieves maximum security and whose power requirements are at a minimum. It is a further object of the invention to provide a means in which a plurality of transmitters and receivers operate over the same band of frequencies so as to provide a maximum information-handling capability, together with maximum reliability.

In accordance with the invention, a time dispersed wave pattern, such as a series of waves of separate frequencies representing a digit of information are transmitted over a particular total frequency band. The term, "time dispersed wave pattern," as used throughout the specification and claims means a series of waves of particular frequencies displaced in a particular time sequence pattern corresponding to an information signal. The order in which these waves are transmitted varies the pattern in accordance with an informational signal code. For security, the code of the signals forming such time dispersed wave pattern is changed at intervals, thus changing not only the wave patterns, but the information represented by particular patterns. Specifically, for a particular code, a particular sequence of subpulses or wave pattern is generated to represent the digit zero, a second independent sequence is used to represent the digit one, etc. To generate a wave pattern of this sort, a particular sequence of gates is activated to turn on the particular order of frequencies which represents the desired information. In this manner, a particular wave pattern or set of frequencies representing a digit of information, such as "one" or "zero," is transmitted.

The receiving portion of the systems which converts the received time dispersed waves into their corresponding information signals in accordance with the code and in the embodiment disclosed comprises a series of time delays and filters which are matched in time duration as well as in frequency to each independent subpulse to permit the generation of a composite time compressed signal. Thus, only the particular wave pattern will pass an individual bank of filters. For example, the first filter is matched to a time delay which delays the first signal a number of units corresponding to the number of successive subpulses in a given sequence and each of the other signals progressively less, so that all signal frequencies out of the receiver filters are time-coincident. These individual outputs of the filters are summed and combined into the composite pulse, which has a voltage amplitude substantially equal to the summation of all the amplitudes of the individual subpulses, provided the particular coded order of which the matched filters have been pre-arranged is achieved. For example, if the number of subpulses, $n$, is equal to 10, the composite pulse is $n^2$ or one hundred units of power, as opposed to the individual pulses, and is also $n^2$ narrower than the total width of the subpulse sequence. This provides the advantages of a time compression system combined with the secure transmission of information.

In addition, the code can be changed by changing the individual patching or code cards in the transmitting and receiving systems to provide a different order of connection of delays to filters.

Any desired type of coding can be used, such as binary, represented by two sequences, trinary, having three sequences, decimal, having ten sequences, or any greater number of sequences. In the present embodiment, ten digits are used, thus requiring ten separate frequency sequences or signal waves.

The invention further discloses the transmission of a plurality of messages simultaneously without interference with each other by making use of the non-real time-coding properties of the system in which the composite output signals occupy only a small fraction of the time required to transmit the subpulse sequences corresponding to the output pulses. As a result, a great deal of time is free for other time-compressed signal waves which can be accommodated without interference by time sampling at the data rate which opens gates for the individual channels at the completion of each group of frequencies making up a signal wave. For example, in a forty-seven-channel code there are 2,209 possible time slots for an information code of 47, and since the summing time delays cause individual subpulses to appear at the output of the receiver at the correct times to provide a composite pulse, the chance that any two transmissions will occur to provide an output at the same time is negligible. The characteristics of a time-dispersed wave pattern in time compression coding, in which signal information is spread over a wide band-width in a coherent fashion, permit a plurality of transmitting and receiving units to operate using substantially identical carrier frequencies, bandwidths and coding sequences without mutual interference. Thus, the transmissions can overlap, and at the receiver they are separated by a sampling device which samples each of the many messages present at the receiver because each time-compressed pulse lasts only a small fraction of the total time. This capability of sharing a common transmission channel without interference greatly simplifies the problem of frequency allocation and permits all transmitting and receiving apparatus to communicate with all other units with but a single transmission system.

Figure 1B:
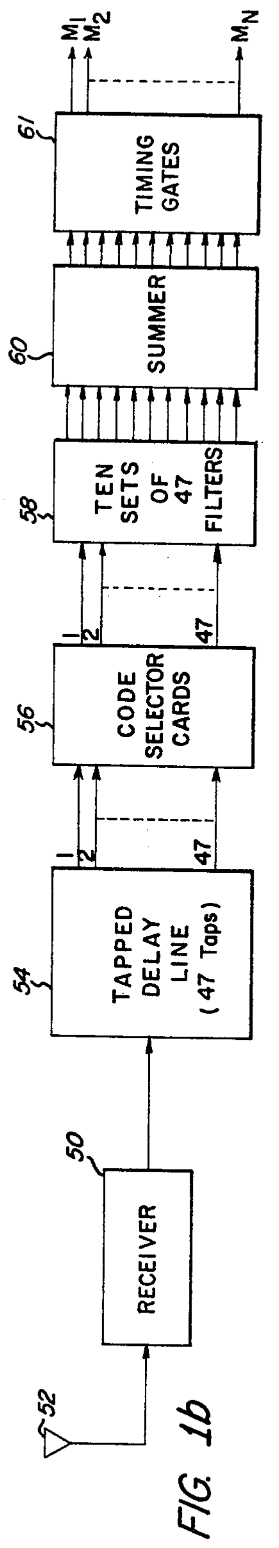
Figure 2A:
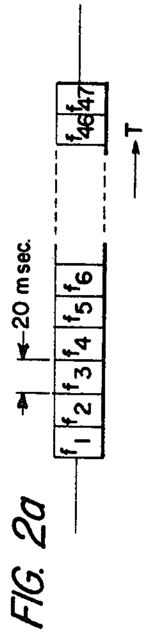
Figure 2B:
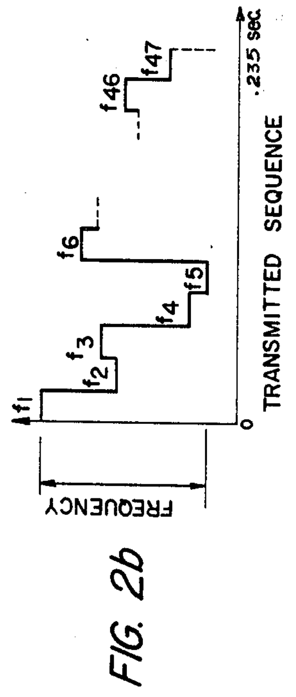
Figure 2C:
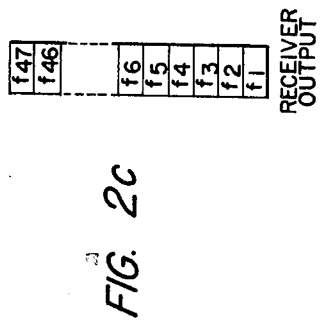
Figure 3A:
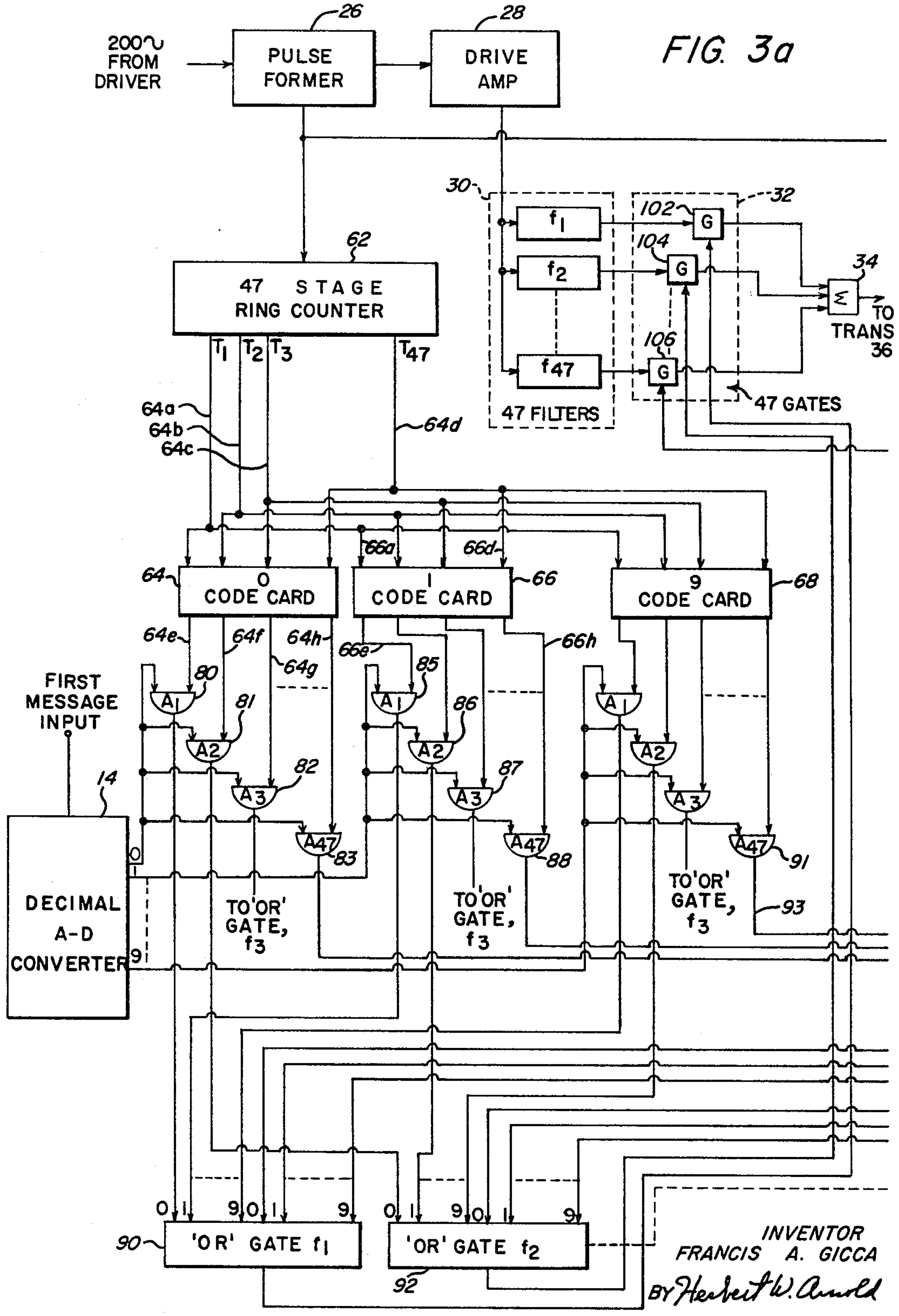
Figure 3B:
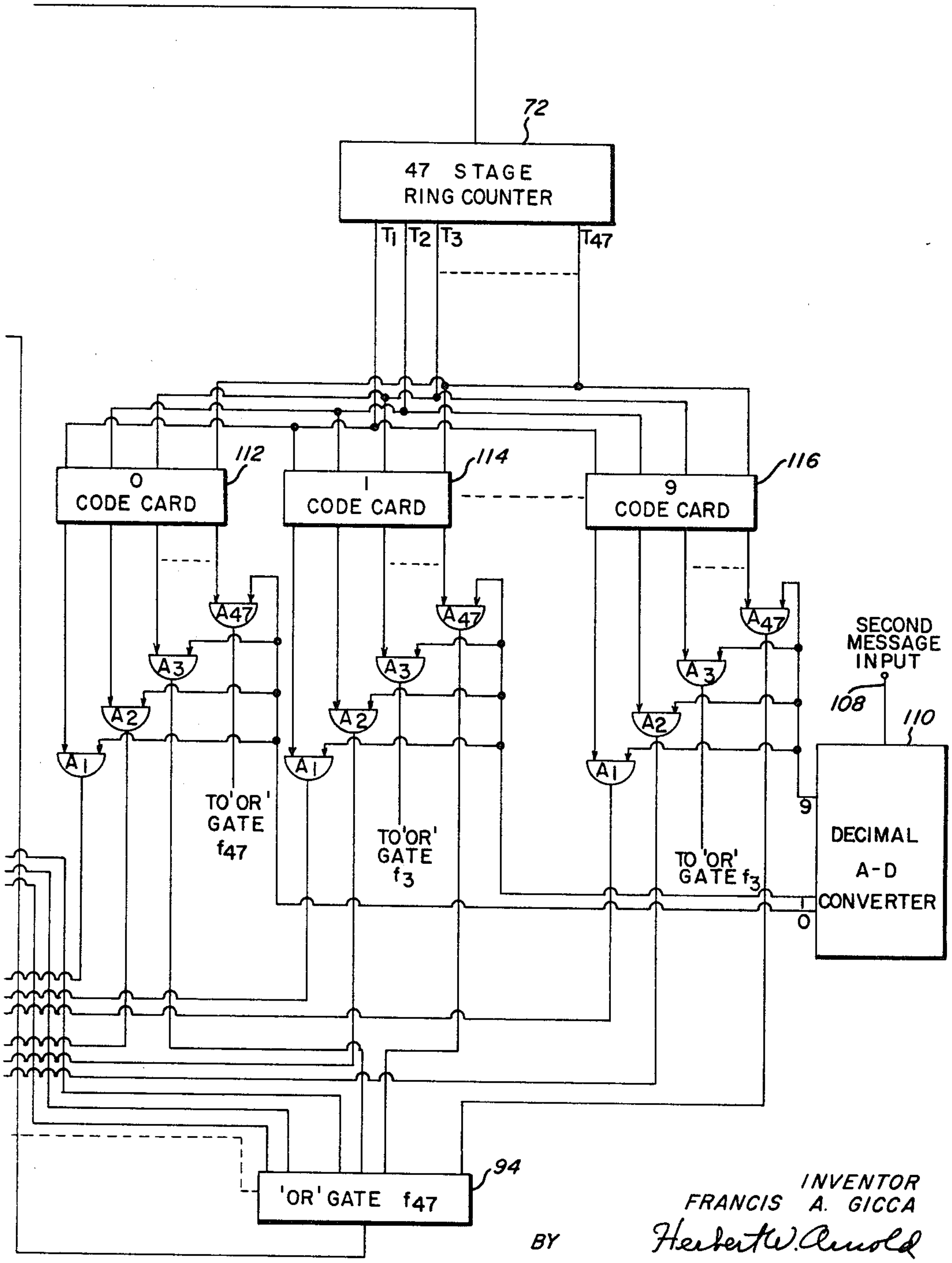

Further advantages and features of the invention will become apparent as the description thereof progresses, reference being made to the accompanying drawings, wherein:

FIG. 1*a* is a schematic diagram of a time compression transmitting system incorporating one embodiment of the invention;

FIG. 1*b* is a time compression receiving system for receiving energy transmitted by the system of FIG. 1;

FIG. 2*a* is a schematic diagram of the amplitude of a transmitted sequence of individual frequencies;

FIG. 2*b* is a diagram of the individual frequencies occuring in the transmitted sequence of FIG. 2*a*;

FIG. 2*c* is the schematic diagram of a composite pulse due to summation of the frequencies of FIG 2*b* at the receiver output;

FIG.3*a* is a schematic diagram of the code selector for determining individual frequency sequences; and FIG. 3*b* is a schematic diagram of another part of the code selector for determining individual frequency sequences.

Referring now to FIG. 1, there is shown a system for transmitting a time dispersed wave of, for example, forty-seven successive frequencies arranged in a particular order representing a particular decimal digit of information such as "zero" through "nine," followed by another time dispersed wave of forty-seven successive frequencies arranged in a different order to represent another decimal digit of information. The present embodiment thus discloses ten particular digits of information, the arrangement of said digits representing either numerals or alphabetic characters, as introduced into the transmitter by means of a well-know Teletype 12 or other device for generating a message such as in the form of a variable signal voltage. A conventional analog-to-digital converter 14 is used to convert the alpha-numeric message from Teletype device 12 into a decimal code of ten digits, such as 0 to 9, each digit being applied through a separate line to a code selector 16 which actuates a particular coded order of 47 individual frequencies. The gating structure to which the code selector is connected comprises forty-seven gates to transmit a particular code, as will later be described in detail.

The forty-seven individual frequencies are generated in a conventional manner by a one-megacycle stable crystal oscillator 20, the one-megacycle signal being divided down by a well-known ten-to-one frequency divider 22 to a 100-kilocycle signal and then by a 500-to-one frequency divider 24 to provide a sine wave signal of 200 cycles per second. This 200-cycle sine wave signal is connected to a conventional pulse former 26, which approximately squares the 200-cycle sine wave, the sinusoidal harmonic components of the squared signal thereof being fed to a driver amplifier 28. The driver amplifier is used to drive components of the 200-cycle signal in the region of 100 kilocycles through a bank of forty-seven filters, such as magnetostrictive filters each having a bandwidth of approximately five cycles and capable of effectively separating out forty-seven subpluse frequencies produced by the pulse former. These forty-seven subpulse signal frequencies extend, for example, at 100.0 kilocycles, 100.2 kilocycles, 100.4 kilocycles, and similar intervals up to 109.4 kilocycles. Signals from a forty-seven filter network bank 30 are actuated by the code selector 16 in the proper order to transmit the particular time dispersed waveform pattern of forty-seven successive frequencies which correspond to one of the ten digits carrying the coded information. The order of the waveform of frequencies may vary as shown in FIG. 2*b*, which may represent a particular digit in the 0-to-9 decimal code. The output signals from the forty-seven-gate matrix 32, which are actulated by the code selector 16, are summed or added into serial form by a conventional summer or summing network 34. Such network may comprise a single summing resistor which adds the successively occurring frequency signals into a single output line in a well-known manner. The summer 34 is connected to a transmitter, herein shown as capable of generating an output at approximately 100 kilocycles. However, any other desired carrier frequency may be used by well-known frequency translation. Thus, the forty-seven frequency code sequence is transmitted. The transmitter output waveform therefore comprises consecutive frequency steps separated by 200 cycles per second, occupying a total bandwidth of 9.4 kilocycles at 100 kilocycles. This output of the transmitter is applied to an antenna 38, which for portable use may be collapsible and tuned to radiate the 100-kilocycle signal wave, the information contained therein having been coded in time dispersed frequency wave patterns according to the operation of code selector 16.

In this manner, the forty-seven successive frequencies are transmitted over a fairly long period of time, which permits data rate to be traded for effectively higher signal power and corresponding range performance.

Referringto FIG. 1*b*, there is shown a receiving system including a well-known receiver 50, such as a superheterodyne, which receives the time dispersed frequency wave patterns by way of antenna 52. Signals from receiver 50 are fed to a tapped delay line 54 having forty-seven taps with individual delays. The time delays are used to shift all individual frequencies so that they occur at one point in time. Thus, forty-seven outputs from the tapped delay line are delayed by times in the reverse order to the occurrence of the individual frequencies transmitted, so that all the individual subpulse frequencies occur at the same time. These frequencies in the form of a time dispersed frequency wave pattern is fed to code selector 56 cards having 47 code which correspond to similar code selector cards in the code selector 16. These cards place the individual subpulse frequencies in the same order as that in which they arrived at the code selector 16 in the transmitter. The idividual frequencies are then fed to a filter matrix 58 of ten sets of forty-seven filters, each filter matched to one of the individual subpulse frequencies. These filters in connection with the appropriate delay from tapped delay line 54 form a well-known matched filter and separate the transmitted wave pattern sequence back into individual subpulse frequencies occurring in one point in time. Each of the forty-seven outputs are fed to a summer or summing device 60 which sums ten banks of forty-seven filters connected in a parallel manner to provide an output signal on any one of ten output lines depending upon which bank contains a signal which can be summed at one time. This output signal is in the form of a composite pulse, as seen in FIG. 2*c*, and is achieved by the summing operation stacking the individual pulses of energy on top of one another to produce a single time compressed pulse having a voltage amplitude which is N times greater than that of a single subpulse. This summer 60 can be a single resistor which sums the output of the 47 individual subpulse frequencies in a well-known analog manner. Thus, high power output is achieved by making the number of subpulses, N, large. However, in making N large, longer transmission times are required, since the subpulses in the time dispersed wave are transmitted in time sequence. The data rate is thus reduced, while the pulse voltage amplitude is multiplied by the factor N, and power amplitude, as noted, is multiplied by $N^2$. This increases the bandwidth occupied by the modulation, since more individual frequency components are required and leads to higher invulnerability to interference from noise due to frequency diversity. The time compression, or time dispersed wave pattern, contains a large number of possible orderings of the basic subpulses N, each of approximately 5 milliseconds duration, and interaction between sets of filter banks and delay lines is normally quite low, since the output of each subpulse from each corresponding filter and delay section is delayed exactly the proper amount for the output pulse to be produced. Thus, the non-real time properties of time compression permit one or more transmissions to occur at the same frequencies without mutual interference, and at the same time permit only signals which are of the correct frequency for a given delay to become summed into a composite output signal.

Referring now to FIGS. 1*a* and 3, there is shown in FIG. 3 a schematic diagram of an encoder 49 comprising the code selector 16 which actuates the forty-seven gate matrix 32 to transmit a time-dispersed wave pattern of individual subpulse frequencies to the summing device 34. While FIG. 3 actually discloses a code selector capable of transmitting two messages over the same transmitter channel by means of transmitter 36 of FIG. 1, nevertheless, for the sake of simplicity, a single message channel, disclosed in FIG. 3, is first described in detail.

A coded sequence of individual frequencies is provided by actuating individual gates in the forty-seven-gate matrix 32 at individual times to transmit a particular frequency pattern, such as the pattern shown in FIG. 2*b*. Code selector 16 includes a forty-seven-stage ring counter 62, which receives a gating pulse from pulse former 26. The forty-seven stage ring counter 62 is a conventional counting device which produces forty-seven individual pulses occurring at times $t_1$ to $t_{47}$ and each occupying a pulse width of approximately 5 milliseconds. Each of these forty-seven operational pulses are fed to ten code or patch cards, which in connection with gating matrix 32 actuates the frequency sequence *f* or, say, the decimal digit zero; that is, zero code card 64. A second code card actuates the frequency sequence for the decimal digit one, namely, code card 66, and other code cards, not shown, for digits 2 to 8 and then to code card 68 representing the digit 9. A second message is transmitted by a pulse from pulse former 26 being fed to a second forty-seven stage ring counter 72 in a manner which will be described in detail later.

Referring to zero code card 64, the forty-seven pulses at times $t_1$ to $t_{47}$ are patched in a particular manner from the forty-seven input lines 64*a*, 64*b*, 64*c*, to 64*d*, and such signals may be patched by the zero code card directly to its forty-seven output lines 64*e*, 64*f*, 64*g*, to 64*h*, without a change or coding in the temperal order of transmitting each individual actuation. Thus, in the order shown by patching each card input line to its corresponding output line, the individual frequency order from zero to forty-seven in filter network 30 becomes, for example, progressively higher in frequency. However, by patching the pulse occurring at $t_{47}$ on line 66*d* into line 66*e*, as shown on card 66, and line 66*a* into line 66*h*, and other lines 2 to 46 in a corresponding manner, the output pulses are arranged on lines 66*e* to 66*h* to actuate or gate frequencies $f_{47}$ to $f_1$ in network 30 so that the output signals become correspondingly lower in frequency as time progresses.

In like maner, code card 68 for digit 9 and the other remaining code cards for digits 2 to 8, not shown, are coded by changing the frequency order to provide, as noted, a plurality of time-dispersed frequency patterns, one of which is, for example, shown in FIG. 2*b*.

To transmit a pattern representing the information digit zero, for example, the decimal A–D converter 14 is actuated by a message input from, for example, the Teletype device 12 in FIG. 1*a* and the zero digit line at time $T_1$ actuates successive well-known "and" gates 80, 81, 82, and 83, as shown, and representing gates $A_1$ through $A_{47}$ of the zero code card 64 to transmit 47 successive frequencies in the ascending order as determined by code card 64. Conventional "and" gates $A_1$ through $A_{47}$, connected to the code card 64, permits the forty-seven frequencies in the gating matrix 32 to be transmitted successively in the ascending order provided the code card 64 is patched to connect each of the forty-seven pulses of the ring counter 62 as shown, directly to the 47 "and" gates for the "0" digit line. Signals from the forty-seven coincident "and" gates $A_1$ to $A_{47}$ are connected to the forty-seven "or" gates corresponding to the forty-seven frequencies to be transmitted $f_1$ to $f_{47}$. Thus, the "and" gate 80 is connected to "or" gate 90, and gate 81 is connected to "or" gate 92, and "and" gate 91, that is, gate $A_{47}$ of the 9-digit code card 68 is connected by line 93 to "or" gate corresponding to frequency $f_{47}$. These conventional "or" gates are for the purpose of gating either a single 0-to-9 digit message or a second 0-to-9 digit message from code cards 112, 114, and 116 over the same individual frequency lines to transmitter gating matrix 32. Thus, by energizing the zero line from the decimal A–D converter 14, the zero line on each of the forty-seven "or" gates is actuated to transmit frequencies in the sequence $f_1$ to $f_{47}$ successively higher at times $T_1$ to $T_{47}$ due to the coding of zero code card 64. However, for code card 66, the frequencies occurring at times $T_1$ through $T_{47}$ may be connected backwards by patching lines on the card, as shown, to produce successive frequencies in a decreasing order at times $T_1$ to $T_{47}$. These frequencies are transmitted by "and" gates 85 to 88 in response to an actuation signal on the "one" digit line from A to D converter 14 and actuate the appropriate "or" gates to transmit successive frequencies in the decreasing order by means of the gating matrix 32, which in connection with code selector 16 forms an encoder 49. Thus, the transmitted wave form, as coded by zero code card 64 and "one" digit code card 66 would appear to resemble a staircase frequency wave, provided this particular choice of code cards is used.

The output of the forty-seven conventional "or" gates 90, 92 . . . 94, which operate to pass one or more signals, provides gating signals to forty-seven series gates 102, 105 . . . 106 to gate forty-seven individual frequencies from the forty-seven filter network 30 into summing device 34 and transmitter 36. For convenience, frequencies $f_3$ to $f_{46}$ have been omitted from FIG. 3. In this manner, a sequence of coded wave patterns are transmitted for reception by a receiver 50 in FIG. 1*b*, appropriate delays by the tapped delay line 54, decoding by the code selector cards in code selector matrix 56, and filtering by ten banks of filters, each bank containing forty-seven filters for matching the appropriate frequency with the appropriate delay to permit summing of the proper frequency and delay in one of the ten channels.

In order to transmit two messages simultaneously, a second message is fed from a teletypewriter, such as teletypewriter 12 in FIG. 1*a*, into terminal 108 to an additional decimal A–D converter 110. This converter actuates the appropriate "and" gates for each of the 0–9 information digits in the order in which the message is to occur and thereby transmit pulses from ring counter 72 in the particular order determined by code cards 112, 114, 116, representing the digits 0, 1, and 9, respectively identical to code cards 64, 66 and 68 of FIG. 3*a*. The particular gating voltages from the individual "and" gates $A_1$ to $A_{47}$ for each of the nine code cards are connected to the forty-seven "or" gates 90, 92 . . . 94, which accept a signal from either the decimal A to D converter 14 or decimal A to D converter 110, depending upon the particular message being transmitted. The transmitter 36 and the forty-seven gating matrix 32 is capable of transmitting two separate messages simultaneously to summation device 34 and transmitter 36. Since the input wave to the forty-seven filter bank 58 is a 5-millisecond pulse at individual frequencies, an optimum matched filter for such a pulse is a network having an impulse response which is also a 5-millisecond pulse at such frequency. The forty-seven gate matrix 32 accepts the input from the code selector 16 and transmits the appropriately spaced pulse. In order to match a particular filter in the ten sets of filters in filter bank 58 in the receiver to a particular input subpulse, it is necessary only to utilize a separate filter, such as a magnetostrictive filter, tuned to the frequency of the desired pulse. This permits the use of common delay networks in the tapped delay line 54. The output of a matched filter, that is, an individual filter section matched and the tapped delay line, is a triangular wave form of 10 milliseconds duration. These triangular responses from all forty-seven filters are delayed in time so as to be coincident and summed. The peak of the compressed receiver pulse occurs at the center point of the input triangular waveforms and is the result of vectorial addition of the individual formed components to provide an amplitude composite pulse. In order to separate two or more messages as described herein, the data output of summer 60 of the receiver is sampled in a fixed time sequence of, for example, one information bit per .235 second. By an appropriate gating structure 61, connected to open a message gate every .235 second from a composite pulse, it is possible to accept information only occurring in such intervals and to disregard all other data. The gate is constructed to open on a signal digit and to remain open for the duration of the digit, that is, 106 microseconds, and to reopen .235 second later to permit the next information digit to pass. For example, a rotary drum-type timing device which opens the gate every .235 second can be used.

When an input compressed or composite pulse to the receiver exceeds a detection threshold, a time sequence is started. An examination gate for each message is open for 106 microseconds to permit the single bit of data which triggered the timing sequence to pass through and become recorded. The gate, not shown, is then closed and no further information is allowed to pass through until .235 second later when the gate is automatically opened again. If any information digit is present in this time slot, it is again allowed to pass through. As before, the gate remains open for 106 microseconds, corresponding to the 3 db width, half power point, of an information bit. This process repeats itself until no further correlation is achieved by such sampling, thereby permitting the code message to be recorded if present. The timing sequence then resets itself and waits for the detection threshold to be exceeded again. Two such timing sequences and timing or examination gates are incorporated in parallel in timing gates 61 to allow sequential examination which is required in order to sort the two simultaneous messages which are present at the receiver output. By using an additional timing gate for each additional message, it is therefore possible to receive multiple messages $M_1, M_2 \ldots M_N$. Although the individual subpulse returns in the wave pattern overlap in time, the only effect on the output of the receiver is a series of compressed pulses separated in time from each other due to the difference in origin of transmission times from the various transmitters. While the input signals to the receiver appear to be scrambled, the time correlation detection technique which opens the gate at individual intervals of .235 second does not permit the complete sequence to be accepted, since the data rate is higher than one bit every .235 second. As the result, the receiver is capable of detecting the proper code from a scrambled sequence provided that two pulse sequences do not exactly coincide in time. Since each information bit requires .235 second to be produced but lasts for only 106 microseconds, the probability that any one bit lies within a particular 106-microsecond interval within a total time of .235 second is very small. Accordingly, by time-sampling the output from the individual ten-filter banks, it is possible to receive simultaneously a plurality of messages over an individual frequency channel without interference. Since code cards 112, 114, and 116 are the same respectively as code cards 64, 66, and 68, and code cards for intervening digits 2 through 8 are the same respectively in FIGS. 3*a* and 3*b*, ten sets of filters 58 in the receiver are sufficient to handle two messages. If separate coding of the cards 112, 114, and 116 were to be used, twenty sets of forty-seven filters in bank 58 would be required in the asynchronous receiver system of FG. 2*b*.

This invention is not limited to the particular details of construction, materials and processes described as many equivalents will suggest themselves to those skilled in the art. Accordingly, it is desired that this invention not be limited to the particular details of the embodiments disclosed except as defined by the appended claims.

What is claimed is:

1. In combination:
means for producing a time dispersed wave pattern corresponding to an informational signal;
means for varying said pattern in accordance with a predetermined code;
and means for receiving and converting said wave pattern to a composite output signal corresponding to the summation of the amplitudes of individual waves in said pattern to provide said corresponding informational signal.

2. In combination:
means for producing a time dispersed subpulse wave pattern corresponding to an information signal;
means for varying said pattern in accordance with a predetermined code;
and means for varying said code.

3. In combination:
means for producing a time dispersed wave pattern which varies as a function of a predetermined signal;
means for transmitting said wave pattern;
means for receiving and correlating said wave pattern to produce a composite signal corresponding to the summation of the amplitudes of individual waves of said pattern and having a relationship substantially corresponding to said predetermined signal;
and means for varying said wave pattern in accordance with an input signal to said first-named means.

4. In combination:
means for producing a time dispersed wave pattern according to an input signal;
means for transmitting said wave pattern;
means for correlating said wave to produce a composite output signal substantially corresponding to the summation of the amplitudes of individual waves of said pattern and said input signal;
means for varying said wave pattern in accordance with a coded input to said first-named means;
and means for varying said coded input.

5. In combination:
means for producing a time dispersed signal pattern which varies in accordance with a code;
means for transmitting said signal pattern;
and means for receiving and correlating said signal pattern in the form of a composite output signal equal to the summation of the signals in said time-dispersed signal pattern, and thereby to recover information contained in said code.

6. In combination:
means for producing a plurality of time dispersed wave patterns in response to input signals;
means for simultaneously transmitting said wave patterns;
means for correlating said wave patterns to produce composite signals substantially corresponding to the summation of the amplitudes of each time-dispersed wave pattern of said input signals;
means for varying said wave patterns in accordance with coding of said input signals;
means for receiving said wave patterns simultaneously;
and means for varying said coding.

7. In combination:
means for producing a plurality of time dispersed wave patterns in response to input signals;
means for simultaneously transmitting said wave patterns;
means for correlating said wave patterns to produce signals substantially corresponding to said input signals;
means for varying said wave patterns in accordance with coding of said input signals;
means for receiving said wave patterns simultaneously and summing waves in each of said wave patterns to produce a composite output signal;
means for varying said coding;
and means for separating individual wave patterns corresponding to said coded input signals.

8. In combination:
means for producing a time dispersed signal pattern which varies in accordance with a variable input signal;
means for transmitting said signal pattern;
means for receiving said signal pattern;
and a plurality of correlating means each adapted to produce a composite output signal corresponding to the summation of the amplitudes of individual signals in said pattern in response to a particular code.

9. In combination:

means for transmitting a plurality of time dispersed signal patterns which vary in accordance with an input signal;

means for receiving said signal patterns over a single channel;

and means for translating said signal patterns into said input signal including means for summing the amplitudes of individual signals in said time-dispersed pattern to form a composite output signal.

10. In combination:

means for transmitting a plurality of time dispersed signal patterns which vary in accordance with a coded input signal;

means for receiving said signal patterns over a single channel;

means for translating said signal patterns into said input signal including means for providing a composite output signal equal to the summation of the amplitude of each signal in each time dispersed signal pattern;

and means for changing said code.

11. In combination:

means for providing a plurality of time dispersed signal patterns which vary in accordance with an individual code;

means for transmitting said signal patterns;

means for receiving said signal patterns over a single channel;

and means for separating and detecting individual signal patterns including means for summing the individual amplitudes of signals in each time dispersed signal pattern thereby to recover said code.

12. In combination:

means for producing a time dispersed wave pattern corresponding to an information signal:

means for transmitting said wave pattern over an individual signal channel;

means for varying said wave pattern in accordance with a predetermined code;

means for translating said signal pattern into said code including means for summing the amplitudes of waves in said time-dispersed pattern to provide a composite output pulse;

and means for varying said code.

13. Means for providing a plurality of individual frequencies occurring successively in time;

means for selecting an individual order of said frequencies in accordance with a predetermined alphabetical-numerical code;

means for transmitting said coded signal;

means for receiving said signal;

means for changing the order of said individual input signals to an order corresponding to said alphabetical-numerical code;

means for summing the output amplitude of said individual signals of individual frequencies to provide a composite output signal;

and means for changing the coding of said transmitted and received signals.

14. In combination:

means for producing a plurality of individual time dispersed signal patterns in response to individual input signals;

means for simultaneously transmitting said signal patterns over a single frequency band width;

means for receiving each of transmitted signal wave patterns;

means for correlating said signal wave patterns in the form of a composite output signal equal to the summation of the amplitudes of each signal pattern, thereby to recover said input signals;

means for separating said signal wave patterns to produce separate output signals corresponding to each of said input signals;

and means for varying the coding of said input signals to provide differing frequency wave patterns corresponding to different input signals.

15. In combination:

means for producing a time dispersed signal pattern which varies in accordance with a binary decimal code;

means for transmitting said signal patterns;

means for receiving and correlating said signal patterns to recover said binary decimal code;

and means for repetitively altering said code.

References Cited

UNITED STATES PATENTS

| | | | |
|---|---|---|---|
| 2,408,692 | 10/1946 | Shore | 325—33 |
| 2,878,316 | 3/1959 | Boothroyd | 179—15.55 |
| 2,913,525 | 11/1959 | Larsen | 325—32 |
| 2,965,702 | 12/1960 | Shanahan et al. | 325—32 |
| 3,030,450 | 4/1962 | Schroeder | 179—15.55 |

RODNEY D. BENNETT, *Primary Examiner.*

D. C. KAUFMAN, *Assistant Examiner.*